United States Patent
Smith-Uchida

(10) Patent No.: US 10,678,460 B2
(45) Date of Patent: Jun. 9, 2020

(54) DETECTING AND MANAGING COLLISIONS IN STORAGE

(71) Applicant: VMWare, Inc., Palo Alto, CA (US)

(72) Inventor: Dave Smith-Uchida, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 45 days.

(21) Appl. No.: 15/918,130

(22) Filed: Mar. 12, 2018

(65) Prior Publication Data

US 2019/0278479 A1    Sep. 12, 2019

(51) Int. Cl.
 *G06F 3/06*    (2006.01)

(52) U.S. Cl.
 CPC ............ *G06F 3/064* (2013.01); *G06F 3/0619* (2013.01); *G06F 3/0673* (2013.01)

(58) Field of Classification Search
 None
 See application file for complete search history.

(56) References Cited

U.S. PATENT DOCUMENTS

| | | | | |
|---|---|---|---|---|
| 2007/0038857 | A1* | 2/2007 | Gosnell | G06F 21/6209 713/165 |
| 2008/0250100 | A1* | 10/2008 | Hatanaka | G11B 27/11 709/203 |
| 2012/0117549 | A1* | 5/2012 | Doyle | G06F 8/4443 717/147 |
| 2015/0363328 | A1* | 12/2015 | Candelaria | G06F 12/0864 711/216 |
| 2017/0153847 | A1* | 6/2017 | Harari | G06F 3/0608 |
| 2017/0364414 | A1* | 12/2017 | Pogosyan | G06F 11/1453 |
| 2018/0336263 | A1* | 11/2018 | Bensberg | G06F 16/284 |

* cited by examiner

*Primary Examiner* — Charles Rones
*Assistant Examiner* — Jonah C Krieger

(57) ABSTRACT

The subject matter described herein is generally directed to detecting and managing collisions in storage. A hash identifier (ID) for a first block of data is calculated and a determination is made whether the calculated hash ID matches hash IDs associated with a storage. If the calculated hash ID matches at least one of the hash IDs, the first block of data is compared with a second block of data, associated with the hash IDs, in the storage. If the first block of data is different from the second block of data based on the comparison, a hash number is associated with the calculated hash ID and the first block of data is stored in storage using the calculated hash ID and associated hash number as an index to the first block of data in the storage. In this manner, collision between data blocks is detected and prevented.

20 Claims, 4 Drawing Sheets

| BLOCK | HASH VALUE |
|---|---|
| DATA BLOCK 1 | \<HASHID>\<DOMAINID>\<HASH NUMBER> |
| DATA BLOCK 2 | \<HASHID>\<DOMAINID>\<HASH NUMBER+1> |
| DATA BLOCK 3 | \<HASHID>\<DOMAINID>\<HASH NUMBER+2> |
| ⋮ | ⋮ |
| DATA BLOCK N | \<HASHID>\<DOMAINID>\<HASH NUMBER+N> |

DETECTING AND MANAGING COLLISIONS IN STORAGE

BACKGROUND

Cryptographic hashes can be used in many different applications, including as a hash function to detect duplicate data or uniquely identify files. In a content addressable storage (CAS) system, a hash value generated by a cryptographic hash can be used to "fingerprint" data, allowing a large block of data to be identified by a much smaller hash value. Cryptographic hashes can be used to reduce collisions of data during storage to a low number (e.g., incorrectly overwriting stored data with new data).

CAS systems often deduplicate data automatically. That is, it is very common for the same data to be stored in multiple places, consuming large amounts of space. For example, virtual machine images may contain a majority of the same data (e.g., system files and installed applications). Thus, by only storing the same data once, considerable reductions in storage cost can be achieved. However, given the fundamental nature of CAS systems in that a large number is represented by a smaller number, collisions can still occur, thereby resulting in corrupt data.

Additionally, attacks against the CAS system are possible as hash functions are broken and computation of colliding hashes becomes possible. An attacker can create a bad block of data that computes a hash equivalent to a hash of a block of data already in the CAS storage and then inject the CAS system with the bad block of data. Thus, collisions can be constructed to allow an attacker to create data corruption or substitute data in the system, resulting in reduced user confidence in this type of storage system.

BRIEF DESCRIPTION OF THE DRAWINGS

The present description will be better understood from the following detailed description read in the light of the accompanying drawings, wherein.

DETAILED DESCRIPTION

The systems described herein provide collision detection and avoidance mechanisms for storage systems, such as content addressable storage (CAS) systems. Unique identifiers are generated for large blocks of data, and used to identify potential collisions when the data is stored to the system. In one example, a collision is identified by further performing a bit by bit comparison between the data to be stored and any existing stored data that has the same hash identifier (ID), resulting in a reliable mechanism to identify possible collisions.

The present disclosure avoids collisions using 2-tuple or 3-tuple hash values instead of using only a hash ID. By generating additional hash information associated with a particular data block, data blocks having the same hash ID, but not containing the same corresponding data values, can be distinguished. That is, hash IDs that would otherwise result in a data collision are augmented with additional data to avoid the data collision. Accordingly, more reliable storage and improved computing results are achieved.

Figure 1:
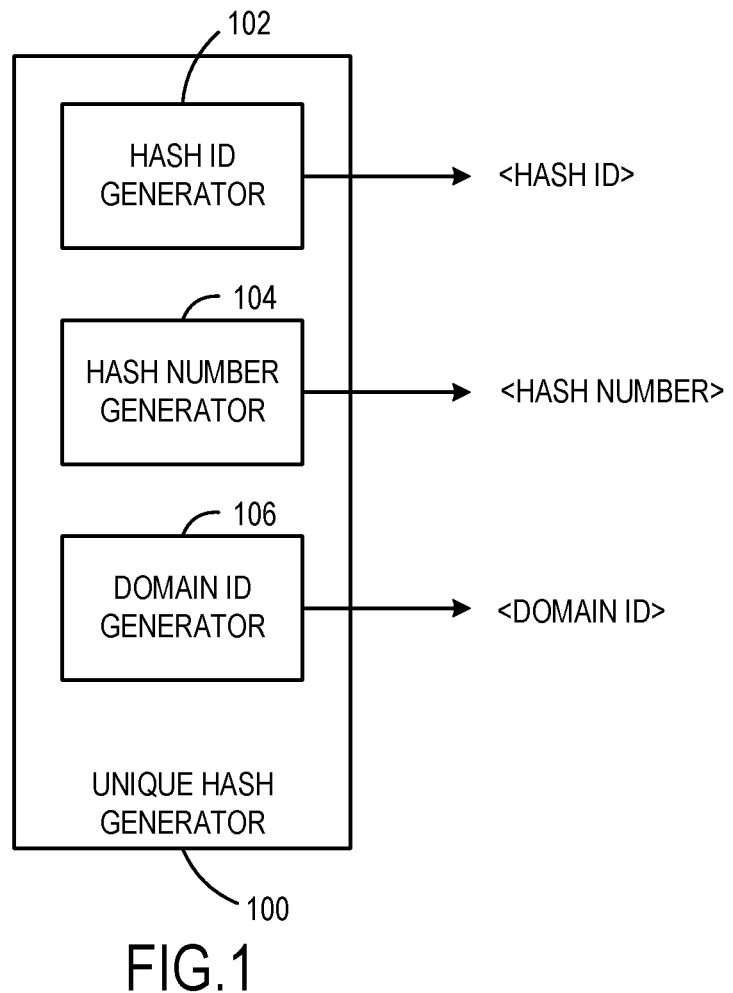
FIG. 1 illustrates a block diagram of a unique hash generator according to an example embodiment.

In various examples, a unique identifier (e.g., unique among the other identifiers used in the CAS system) such as a 2-tuple or 3-tuple is generated by a unique hash generator 100 as illustrated in FIG. 1. The 2-tuple is defined by <hash ID><hash number>(e.g., in any order) that is generated by a hash ID generator 102 and a hash number generator 104, respectively, of the unique hash generator 100. The 3-tuple is defined by <hash ID><domain ID><hash number>(e.g., in any order) generated by the hash ID generator 102, a domain ID generator 106 and the hash number generator 104, respectively, of the unique hash generator 100. In one example, the hash ID is generated by the hash ID generator 102 using a cryptographic hash such as Secure Hash Algorithm-256 (SHA-256), but any hash algorithm can be used. Thus, using the 2-tuple and 3-tuple, the hash number is used to distinguish between or among different data blocks that compute to the same hash ID.

As described in more detail herein, the hash number uniquely identifies data blocks that compute to the same hash ID, but contain different data bit values. The domain ID is a unique domain number (e.g., unique in the CAS system) identifying a domain for the data block. It should be noted that the "domain" in various examples herein refers to an arbitrary group of data, such as arranged into groups or banks of data. In one example, the domain is a defined set of data controlled by one system integrated together, including two virtual machines (VMs) on one host, an arbitrary group of data, etc. In some examples, the domain is defined by a set of data stored by servers or a set of severs, such as a virtual storage area network (VSAN) cluster. It should be appreciated that the examples described herein can be implemented in non-virtualized or virtualized computing environments.

Figure 2:
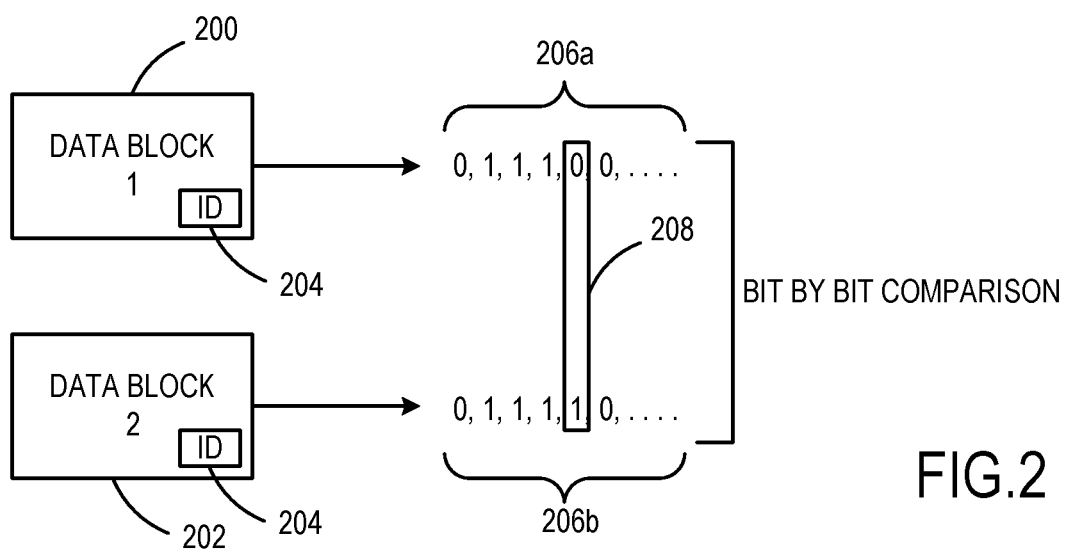
FIG. 2 illustrates data comparison according to an example embodiment.

As illustrated in FIG. 2, to detect collisions between data blocks 200 and 202 having the same hash ID 204, but different actual bits 206a and 206b, a bit by bit comparison of the two data blocks 200 and 202 is performed. For example, when data block 202 is to be stored in the system (e.g. in a CAS system), the hash ID is computed. The hash ID is then used to find any matching blocks in any of the domains (e.g., data banks) currently stored in the system that have the same hash ID. If no matching hash ID is found, in one example, a unique hash value (<hash ID><domain ID><hash number>) is generated with the computed hash ID, domain ID and a hash number of 0 by the unique hash generator 100, which defines a unique identifier for that data block. It should be noted that in some examples, instead of using the 3-tuple, a 2-tuple is used that does not include the <domain ID>.

However, if a matching hash ID 204 is found as illustrated in FIG. 2 (i.e., the hash IDs 204 match), the data bits 206a referenced by that hash ID 204 (corresponding to the data block 200) is retrieved and compared to the incoming data bits 206b (corresponding to the data block 202). Thus, in this example, the data corresponding to the data block 200 is compared to the data corresponding to the data block 202 in a bit by bit comparison. If the data of data block 200 is found to be identical to the data of data block 202, indicating that data block 200 and data block 202 are the same blocks of data (e.g., identical data blocks or files), then the existing unique hash value (or index) comprising hash ID, domain ID and hash number is returned. In this case, the system already has an existing copy of that data, and there is no collision. If the data of data block 200 is overwritten with the data of data block 202, no crash or corruption of the data occurs because the data bits for the data blocks 200 and 202 are identical.

If there is a difference in the data, for example one or more data bits 208 are identified in the data sequence of data block 200 and data block 202 as being different, a new unique hash value for the data block 202 is generated by the unique hash generator 100. In one example, the new unique hash value (or index) is generated by incrementing the previous hash number (in the present example, from 0 to 1) to define an incremented hash number. Thus, in the present example, the data block 200 is referenced by the original hash value <hash ID><domain ID><hash number>, while a new hash value is generated for the data block 202, such that the data block 202 is referenced by the modified hash value <hash ID><domain ID><hash number+1>. In this way, duplicated data is assigned the same identifier and only stored once, but data that has the same hash ID with different actual data is differentiated by generating a new unique hash value.

Thus, the present disclosure addresses storage and crash concerns using a hash value that uniquely identifies data blocks. It should be appreciated that any collision is essentially data corruption and, since the hash value is always computed for a given block of data, once two colliding blocks are found, with the present disclosure, the collision is avoided and the conflict fixed, thereby also preventing any future collisions. It should be noted that the generated hash values are stored in a hash table in some examples. However, the generated hash values can be stored in any suitable storage structure, such as any type of data structure that can be used to track values.

The unique hash generator 100 is configured as signature-generating logic that defines de-duplication logic in various examples. In accordance with the techniques described herein, when executed by computing devices, the unique hash generator 100 operates as signature-generating logic to compute a collision-resistant signature for a set of data such as a chunk of a file or an entire file. As used herein, a "signature" of a set of data refers to a value that is computed from the content of the set of data, and can be used to uniquely identify the set of data with a high degree of accuracy. For example, once a chunk is delimited in a file, the unique hash generator 100 is operable in one example as the signature-generating logic to perform a collision-resistant cryptographic hash function from the bits in the chunk to compute a signature for that chunk, which additionally includes at least a hash number and optionally a domain ID. Thus, hash values generated by the present disclosure can reliably prevent data collisions, such as during copying operations, as well as detect modifications to stored data.

It should be noted that different cryptographic functions may be used to generate the hash ID. For example, functions that can be used to compute a signature include, but are not limited to, Message Digest 5 (MD5), SHA, SHA-256, Hash127, Panama Hash, and any other functions that generate a unique value from the data bits. In general, any function that produces a sufficiently large signature to satisfy the collision-resistance goals of a particular embodiment may be used in conjunction with the techniques described herein. However, the present disclosure is not limited to cryptographic hashing, but older or weaker hashing functions (that generate more collisions) can be used, thereby improving the functioning of the device because these functions are faster and/or simpler to compute. This also allows legacy systems to be compatible with newer CAS systems. Also, these functions can be used for future proofing, such that updating systems to new cryptographic hashing techniques and re-indexing is not needed.

Figures 3, 4:
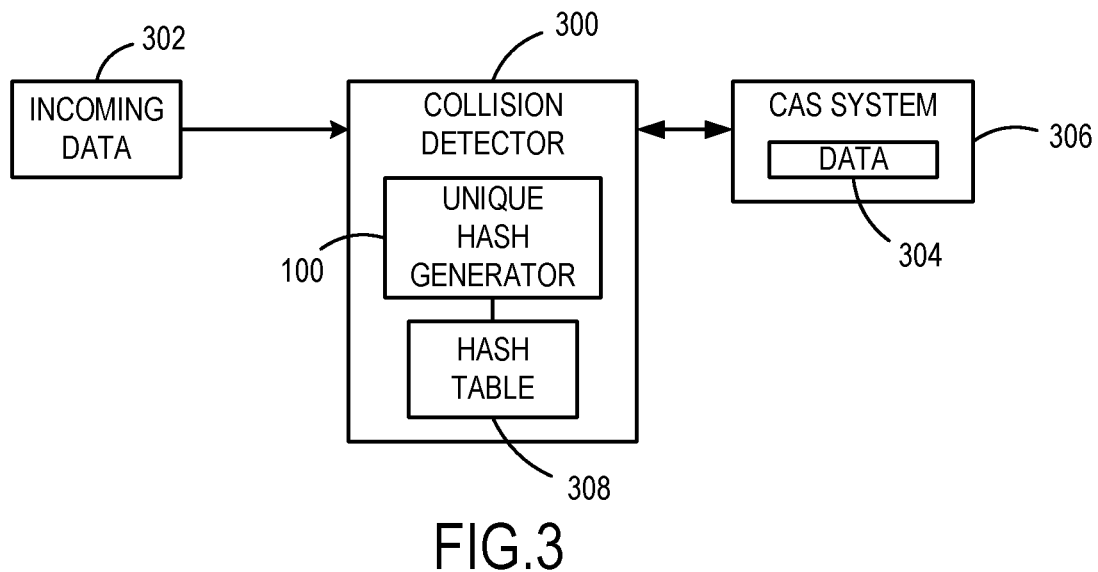
FIG. 3 is a block diagram of a collision detector according to an example embodiment.
FIG. 4 is a block diagram of a hash table according to an example embodiment.

FIG. 3 illustrates a collision detector 300 in one example, which may be embodied as a computing device, or a portion of a computing device, having storage. The collision detector 300 is configured to detect possible collisions between incoming data 302 and data 304 stored in a CAS system 306. For example, the incoming data 302 can be data being copied or moved from one domain to another domain. The example below assumes that the incoming data 302 has a hash value already generated and associated therewith, such as previously generated by the unique hash generator 100. If the incoming data 302 does not have a hash value associated therewith (e.g., being imported into the system), the unique hash generator 100 generates a hash value for the incoming data 302 as described herein. It should be noted that the process described below relating to the generation of the unique hash value is not limited to being performed only upon copying of data (such as from one domain to another domain), but is also performed in various examples the first time the data is stored when the data has no hash value associated therewith.

In the illustrated example, the collision detector 300 accesses a hash table 308 to determine whether the hash value for the incoming data 302 to be stored in the CAS system 306 is the same as the hash value for data 304 already stored in the CAS system 306. If there is no identical hash value, the collision detector 300 allows the incoming data 302 to be written to the CAS system 306 and stores the hash value associated with the incoming data 302 in the hash table 308. In this case, the collision detector 300 determines that there is no collision of data because the hash values are not identical.

If the collision detector 300 determines that the hash value associated with the incoming data 302 is identical to the hash value for data 304 stored in the CAS system 306, the collision detector 300 initiates a collision prevention process. That is, in this case, the collision detector 300 determines that there is a possible collision of data as a result of the identical hash values. The initiation of the collision prevention process includes a bit by bit comparison of the data bits for the incoming data 302 with the data bits for the data 304 stored in the CAS system 306. For example, the collision detector 300 compares each bit of data starting at the first bit of data for the data block for the incoming data 302 with each bit of data starting at the first bit of data for the data block for the data 304 that has the identical hash value. In this way, the collision detector 300 is configured to detect a possible collision by determining whether there are differences in the data blocks having the same hash value.

Specifically, if a determination is made after completing the bit by bit comparison of the data bits in the incoming data 302 with the data bits in the data 304 stored in the CAS system 306 that the data bits are identical, then the incoming data 302 is an exact duplicate of the data 304 stored in the CAS system 306. Thus, no collision is possible because the data is exactly the same. In one example, when the data bits are identical between the incoming data 302 and the data 304 stored in the CAS system 306, the data 304 is maintained and the incoming data 302 not copied to the CAS system 306.

If a determination is made after completing the bit by bit comparison of all the data bits in the incoming data 302 with all the data bits in the data 304 stored in the CAS system 306 that the data bits are not identical, then the incoming data 302 is not an exact duplicate of the data 304 stored in the CAS system 306. Thus, a collision will occur if the incoming data is copied to the CAS system 306, for example, by attempting to overwrite the data 304 or by linking the data 302 with the data 304. In this case, a new hash value for the incoming data is generated by the unique hash generator 100 before the incoming data 302 is copied to the CAS system 306 (or associated with the data 304). For example, as described herein, the data stored in the CAS system 306 has a hash value of <hash ID><domain ID><hash number>, while the new hash value generated for the incoming data 302 is <hash ID><domain ID><hash number+1>. It should be noted that in some examples, instead of a 3-tuple value, the unique hash generator 100 generates a 2-tuple value as <hash ID><hash number>. It should also be noted that in some examples, storing a block of data in the storage using the calculated hash ID is performed upon determining that the calculated hash ID does not match any of the plurality of hash IDs associated with data already in the storage.

It should be appreciated that if two data blocks have the same hash ID, but a different hash number, for example as described above, and another data block to be copied to the CAS system 306 has the same hash ID and hash number (e.g., the same <hash ID><domain ID><hash number> value), the collision detection process is again performed. If the data is determined to be the same as the stored data based on the bit by bit comparison, either the incoming data is not stored (unless an overwrite command is issued, resulting in the incoming data overwriting the existing data). However, if the data is determined to be different, based on the bit by bit comparison, the unique hash generator 100 generates a unique hash value for the incoming data, which in this case is <hash ID><domain ID><hash number+2> as illustrated in hash table 400 of FIG. 4, as the unique hash value <hash ID><domain ID><hash number+1> is already being used and associated with other stored data. As illustrated in the hash table 400, while the Data Blocks 1-3 have the same hash ID value and domain ID value, each has a unique hash value resulting from the added hash number, which is generated by the unique hash generator 100. As a result, these non-identical data blocks, while having the same hash ID, will not collide. In one example, the Data Blocks 1-3 have hash numbers of 0, 1 and 2.

It should be noted that the hash table 400 can store additional data relating to the data blocks. For example, the domain ID for the same data blocks stored in different domains can be linked to each other.

Thus, the hash value for the incoming data 302 and the data 304 stored in the CAS system 306 are made to uniquely identify each and avoid a collision therebetween (e.g., not copying or associating non-identical data because the data has a hash ID identical to already stored data). For example, each time there is a match in hash values, but the data bits are not identical, a new unique hash value is generated by adding a differentiating character, such as the hash number, to the hash value. As a result, all instances of collision between this data is avoided by the present disclosure. As such, data having hash values generated by the present disclosure can survive migration, failure, recovery, redundancy, etc.

It should be appreciated that the newly generated unique hash value can include any type of differentiating characteristic and it not limited to only incrementing the hash number by one. For example, the hash number can be incremented by a different value or decremented, and in some examples, is a number specific to a particular domain. Additionally, the hash number alternatively may be a hash letter or other unique character identifier. It should be noted that the hash number, as well as the domain ID may be added to the hash ID in different ways. For example, the hash number and/or domain ID can be prepended, appended, etc. as a 2-tuple or 3-tuple. In some examples, the domain is anything that is globally unique and shared among systems generating the hash number for the domain.

It should be appreciated that in the first instance, when the data 304 is initially stored in the CAS system 306, the same hash value generation process and/or collision detection process is performed. Additionally, if the data 304, when initially copied into the CAS system 306 does not comply with the unique identified requirements of the present disclosure, for example, only having a hash ID associated therewith, the unique hash generator 100 generates a 2-tuple or a 3-tuple for the data 304 before being stored the data in the CAS system 306. Alternatively or in addition, a hash number of '0' or null may be used with hash values without any collisions.

It also should be noted that as used herein, a CAS system, such as the CAS system 306, refers to any content addressable storage or associative storage where data can be retrieved based on its content and not its storage location. That is, the data is addressed by a unique name and not a physical location. The present disclosure can be implemented with memory systems in addition to storage systems.

For example, the CAS system 306 can be any type of non-volatile storage device commonly used for data storage. In some examples, the CAS system 306 includes, but is not limited to, one or more of solid-state devices (SSDs), hard disks, local disks, disk arrays, or virtual storage area networks, among others. In one example, the CAS system 306 is a local storage system of a computer system supporting a database management module, such as a hard drive disk. In another example, the CAS system 306 is a remote storage system that can be accessed via a network, such as a network-attached storage (NAS). In still another example, the CAS system 306 is a distributed storage system such as a storage area network (SAN) or a virtual SAN. Depending on the environment, the CAS system 306 may include other components commonly found in these types of storage systems, such as network adapters, storage drivers and/or storage management servers. The CAS system 306 is scalable, and thus, the number of data storage devices forming the CAS system 306 can be changed as needed to increase or decrease the capacity of the CAS system 306 to support increase/decrease in workload. Consequently, the exact number of data storage devices included in the CAS system 306 can vary from one to hundreds or more.

The software processes described herein are any software programs, applications or software routines that can run on one or more computer systems, which can be physical computers, virtual computers or processes such as VMware® VMs or other virtual computing instances, or a distributed computer system. In some examples, the software processes initiate various data storage operations, such as read, write, delete and rename operations, for data stored in storage systems. The system and functionality described herein is applicable to systems that are virtualized and not virtualized. For example, the unique hash generator 100 and/or the collision detector 300 can be implemented as software running on one or more computer systems, which can be physical computers, virtual computers, or a distributed computer system. However, in other examples, the unique hash generator 100 and/or the collision detector 300, or other components or modules described herein can be implemented in any combination of hardware and software.

Figure 5:
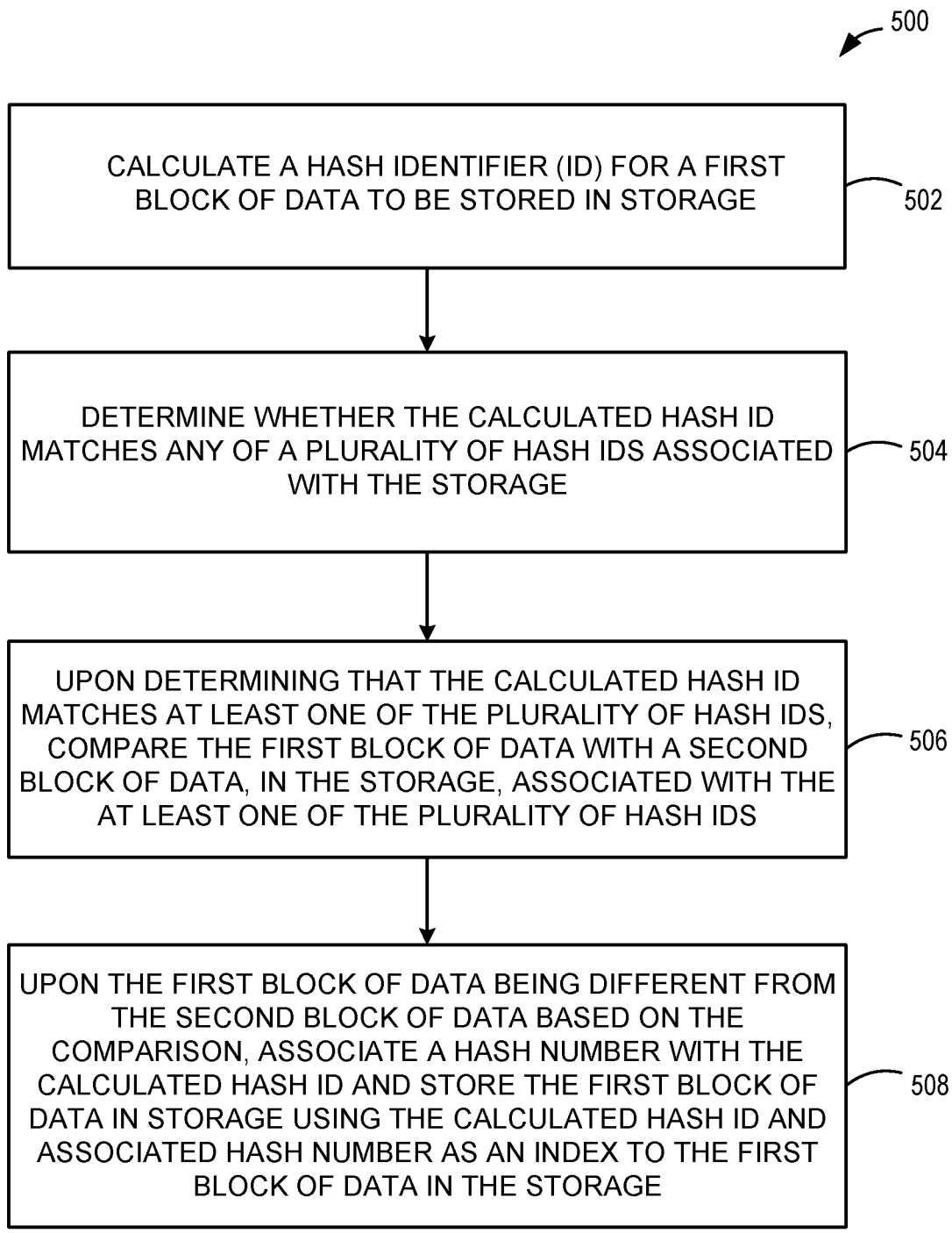
FIG. 5 is a flowchart illustrating a process for managing collisions in storage according to an example embodiment.

In various examples, a computing device executes the logic above using hash value generation and/or collision detection operations to generate unique hash values to avoid collisions in a CAS system. With particular reference to FIG. 5, in one example, a computing device generates unique hash values for data to be stored in a storage system, such as the CAS system 306 (shown in FIG. 3). FIG. 5 is a flowchart illustrating operations of a method 500 for managing collisions in storage, such as in the CAS system 306. The example operations illustrated in the flowcharts described herein can be performed in a different order than illustrated, and each of the operations can be performed simultaneously, concurrently or sequentially with any of the other operations. Operations may be added or removed, which are contemplated by this disclosure. Additionally, one or more flowcharts or portions thereof can be combined without departing from the scope of this disclosure.

The method 500 calculates a hash ID for a first block of data to be stored in storage at 502. In one example, the storage is a CAS system in which the first block of data is to be stored. The calculated hash ID is determined using one or more cryptographic functions, such as an SHA-256 cryptographic hash. The calculated hash ID is stored and associated with the first block of data, such as in a hash table. In some examples, the calculated hash ID defines a unique hash value, such as part of a 2-tuple or 3-tuple that also includes a hash number and a domain ID as described herein.

The method 500 determines whether the calculated hash ID matches any of a plurality of hash IDs associated with the storage at 504. For example, a determination is made whether the hash ID for the first block of data is identical to the hash ID for any blocks of data in the storage.

Upon determining that the calculated hash ID matches at least one of the plurality of hash IDs, the method 500 compares the first block of data with a second block of data, in the storage, associated with the at least one of the plurality of hash IDs at 506. For example, a bit by bit comparison of the first and second data blocks is performed to determine if there are any differences in the bit values for the first and second data blocks. In some examples, upon detecting any difference, the comparison process terminates. However, in other examples, a comparison of all of the bits of the first and second data blocks is performed to determine if more than one difference exists.

Upon determining that the first block of data is different from the second block of data based on the comparison, the method 500 associates a hash number with the calculated hash ID at 508 and stores the first block of data in storage using the calculated hash ID and associated hash number as an index to the first block of data in the storage, and which define a unique hash value. In one example, a unique 2-tuple is thereby defined for each of the first and second blocks of data and associated as indices to these blocks of data in the hash table. In other examples, as described herein, a unique 3-tuple is associated with the first and second blocks of data. Thus, collisions are avoided between the first and second blocks of data that have the same hash ID.

Figure 6:
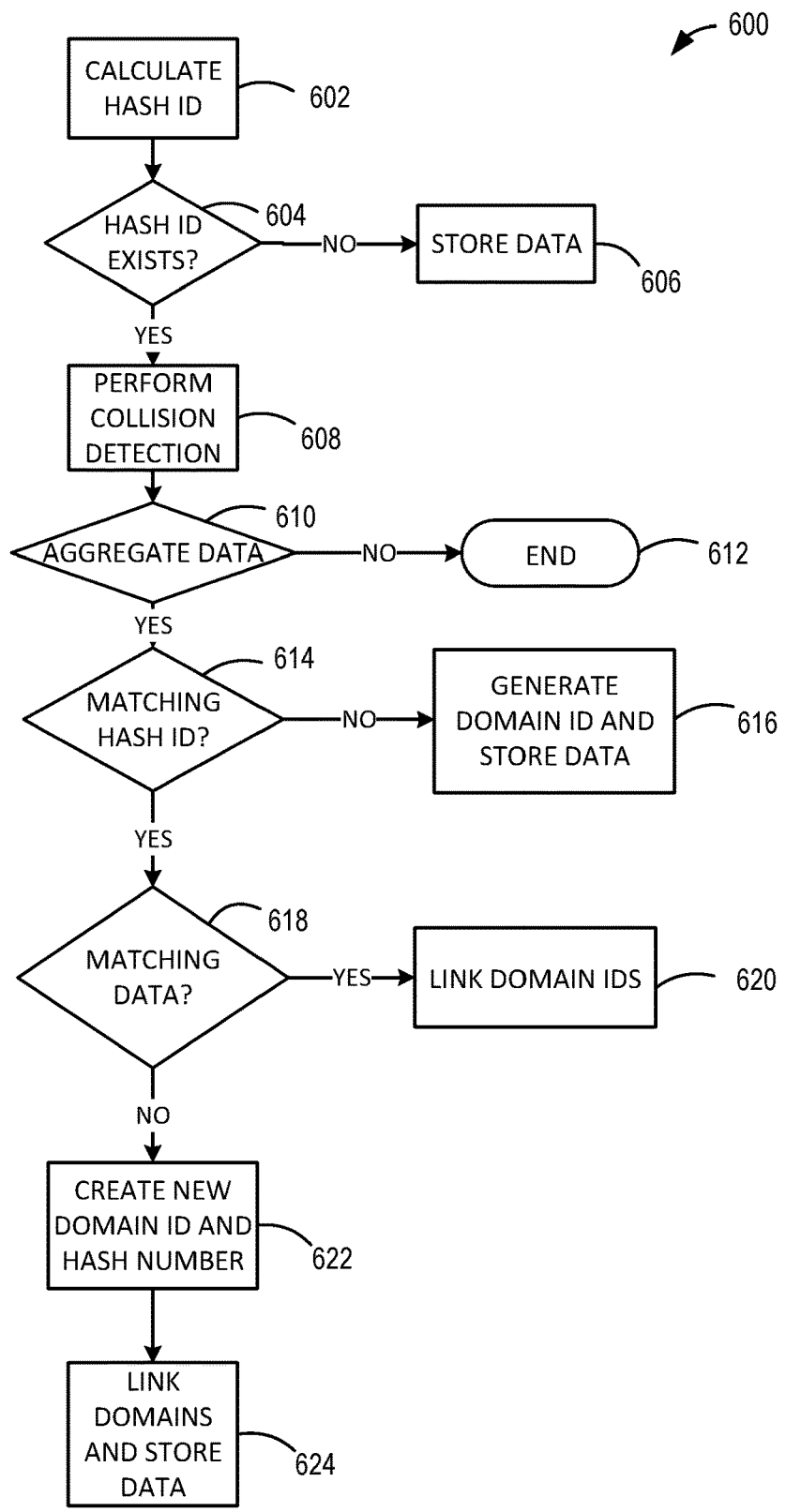
FIG. 6 is a flowchart illustrating a process for generating unique identifier values across domains according to an example embodiment.

FIG. 6 is a flowchart illustrating operations of a method 600 performed by a process for generating unique identifier values, particularly unique hash values, for data in a storage system. The method includes calculating a hash ID for data in a first domain at 602. For example, a block of data to be stored in the first domain (e.g., a bank of data) has a hash ID generated and associated therewith using a cryptographic hashing function as described herein. The hash ID, which in various embodiments forms part of a 2-tuple or 3-tuple (unique hash value) associated with the data block, is stored, such as in the hash table.

A determination is made at 604 whether the hash ID exists. In particular, a determination is made whether the hash ID value already exists in the first domain. If the hash ID generated for the data does not exist in the first domain, the data is stored in the first domain at 606. In one example, the data is stored in a storage bank or data group of a CAS system.

If the hash ID does exist in the first domain (e.g., identical hash ID), the collision detection is performed at 608. For example, the collision detection may be performed using the method 500, including determining whether a new hash value is to be generated, including the original hash ID, with a new hash number as described herein. The new hash value is then stored, such as in the hash table.

A determination is also made whether data is to be aggregated at 610. For example, a determination is made as to whether the data is to be moved to, copied to or associated with another domain (e.g., a second domain). If the data is not going to be aggregated, the method 600 ends at 612. If the data is to be aggregated, a determination is made at 614 as to whether there is a matching hash ID in the second domain. Thus, based on a later determination that the data is to be aggregated to the second domain, it is then determined whether there is also a matching hash ID in the second domain. For example, a search is performed on the hash IDs in the second domain to determine if there are any identical hash IDs (i.e., hash IDs having the same value). If there is no matching hash ID in the second domain, a domain ID is generated for the data and the data is stored at 616. The domain ID in various examples is any value indicative of the particular domain.

If there is a matching hash ID in the second domain as determined at 618, then a further determination is made at 618 whether the data in the first domain and the data in the second domain have matching data. For example, a data block uniqueness determination is made using a bit by bit comparison as described herein. This determination identifies any differences between the data of the first domain and the data of the second domain. If the data in the first and second domains is the same, indicating that it is same the block of data, the domain ID for the second domain (e.g., a new domain ID for the second domain) is linked to the domain ID for the first domain (i.e., the old domain ID) at 620. This linking can be stored in a table, such as associated with the hash table.

If a determination is made at 618 that the data of the first and second domains is not matching, then the data blocks corresponding to each are determined to be different and a new domain ID is created for the data in first domain, as well as a new hash number, at 622, the data is stored, and the two are linked together at 624. It should be appreciated that at a later time, when new data is to be stored, the same process described above is performed to store the data. Additionally, as should also be appreciated, the 3-tuple can be used to retrieve the data. Also, in some examples, the hash IDs are chained together, such as when aggregating storage systems together.

Thus, various examples use more than the cryptographic hash ID to associate data, which includes domain information (e.g., a locally unique identifier) and a hash number, thereby resulting in a completely unique hash value for a particular block of data. As described herein, the 3-tuple (or 2-tuple) can be generated on the source side and then the data moved to another system. In various examples, the data, once identified by the unique hash value, does not have to be changed. That is, the original source will not have to be changed after the hashing is performed.

Exemplary Operating Environment

It should be understood that any of the examples described herein are non-limiting. As such, the present disclosure is not limited to any particular embodiments, aspects, concepts, structures, functionalities or examples described herein. Rather, the present disclosure may be used in various ways that provide benefits and advantages in non-virtualized and virtualized computing environments in general.

While some virtualized embodiments are described with reference to VMs for clarity of description, the disclosure is operable with other forms of virtual computing instances (VCIs). A VCI may be a VM, a container, and/or any other type of virtualized computing instance.

In examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'server', 'computing device' and the like are used herein to refer to any device with processing capability such as a physical processor for executing computer program code or other instructions. Those skilled in the art will realize that such processing capabilities are incorporated into many different devices and therefore the terms 'computer', 'server', and 'computing device' each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for tracking and receiving a disk allocation state, including when a crash occurs during a checkpoint operation.

The term "comprising" is used in this specification to mean including the feature(s) or act(s) followed thereafter, without excluding the presence of one or more additional features or acts.

What is claimed is:

1. A system for managing collisions in storage, the system comprising:
   at least one physical processor; and
   at least one memory comprising computer program code, the at least one memory and the computer program code configured to, with the at least one physical processor, cause the physical processor to at least:
   calculate a hash identifier (ID) for a first block of data to be stored in storage;
   determine whether the calculated hash ID matches any of a plurality of hash IDs associated with the storage; and
   upon determining that the calculated hash ID matches at least one of the plurality of hash IDs:
      compare the first block of data with a second block of data, in the storage, associated with the at least one of the plurality of hash IDs; and
      upon the first block of data being different from the second block of data based on the comparison, associate a hash number with the calculated hash ID to generate a unique 2-tuple and store the first block of data in storage using the 2-tuple as an index to the first block of data in the storage.

2. The system of claim 1, wherein the computer program code is configured to:
   receive a request for the first block of data;
   retrieve the first block of data from the storage based on the 2-tuple; and
   provide, in response to the received request, the retrieved first block of data.

3. The system of claim 1, wherein the hash number comprises an incremented hash number associated with the at least one of the plurality of hash IDs.

4. The system of claim 1, wherein the computer program code is configured to, upon determining that the calculated hash ID does not match any of the plurality of hash IDs, store the first block of data in the storage using the calculated hash ID as the index.

5. The system of claim 1, wherein the computer program code is configured to associate a domain ID with the calculated hash ID and the hash number as a unique 3-tuple corresponding to the first block of data.

6. The system of claim 1, wherein the storage has a plurality of domains associated therewith, each of the plurality of domains corresponding to a defined set of data in the storage, and the computer program code is configured to associate the calculated hash ID and the hash number with a domain ID associated with a first domain, of the plurality of domains, to which the first block of data belongs.

7. The system of claim 6, wherein the computer program code is configured to:
move the first block of data from the first domain to a second domain;
determine whether the calculated hash ID matches any of a plurality of hash IDs in the second domain; and
upon determining that the calculated hash ID matches at least one of the plurality of hash IDs in the second domain:
compare the first block of data with a third block of data, in the second domain, associated with the at least one of the plurality of hash IDs; and
upon the first block of data being different from the third block of data based on the comparison, associate a second hash number and a domain ID with the calculated hash ID, store the first block of data in the second domain using the calculated hash ID, associated hash number and associated domain ID as an index to the first block of data in the second domain, and link the domain ID between the first and second domains.

8. A method for managing collisions in storage, the method comprising:
calculating a hash identifier (ID) for a first block of data to be stored in storage;
determining whether the calculated hash ID matches any of a plurality of hash IDs associated with the storage; and
upon determining that the calculated hash ID matches at least one of the plurality of hash IDs:
comparing the first block of data with a second block of data, in the storage, associated with the at least one of the plurality of hash IDs; and
upon the first block of data being different from the second block of data based on the comparison, associating a hash number with the calculated hash ID to generate a unique 2-tuple and store the first block of data in storage using the 2-tuple as an index to the first block of data in the storage.

9. The method of claim 8, further comprising:
receiving a request for the first block of data;
retrieving the first block of data from the storage based on the 2-tuple; and
providing, in response to the received request, the retrieved first block of data.

10. The method of claim 8, wherein the hash number comprises an incremented hash number associated with the at least one of the plurality of hash IDs.

11. The method of claim 8, further comprising, upon determining that the calculated hash ID does not match any of the plurality of hash IDs, storing the first block of data in the storage using the calculated hash ID as the index.

12. The method of claim 8, further comprising associating a domain ID with the calculated hash ID and the hash number as a unique 3-tuple corresponding to the first block of data.

13. The method of claim 8, wherein the storage has a plurality of domains associated therewith, each of the plurality of domains corresponding to a defined set of data in the storage, and further comprising associating the calculated hash ID and the hash number with a domain ID associated with a first domain, of the plurality of domains, to which the first block of data belongs.

14. The method of claim 13, further comprising:
moving the first block of data from the first domain to a second domain;
determining whether the calculated hash ID matches any of a plurality of hash IDs in the second domain; and
upon determining that the calculated hash ID matches at least one of the plurality of hash IDs in the second domain:
comparing the first block of data with a third block of data, in the second domain, associated with the at least one of the plurality of hash IDs; and
upon the first block of data being different from the third block of data based on the comparison, associate a second hash number and a domain ID with the calculated hash ID, storing the first block of data in the second domain using the calculated hash ID, associated hash number and associated domain ID as an index to the first block of data in the second domain, and linking the domain ID between the first and second domains.

15. One or more non-transitory computer storage media having computer-executable instructions that, upon execution by a processor, cause the processor to at least perform operations comprising:
calculating a hash identifier (ID) for a first block of data to be stored in storage;
determining whether the calculated hash ID matches any of a plurality of hash IDs associated with the storage; and
upon determining that the calculated hash ID matches at least one of the plurality of hash IDs:
comparing the first block of data with a second block of data, in the storage, associated with the at least one of the plurality of hash IDs; and
upon the first block of data being different from the second block of data based on the comparison, associating a hash number with the calculated hash ID to generate a unique 2-tuple and store the first block of data in storage using the 2-tuple as an index to the first block of data in the storage.

16. The one or more non-transitory computer storage media of claim 15, wherein the computer-executable instructions further cause the processor to at least perform operations comprising:
receiving a request for the first block of data;
retrieving the first block of data from the storage based on the 2-tuple; and
providing, in response to the received request, the retrieved first block of data.

17. The one or more non-transitory computer storage media of claim 15, wherein the hash number comprises an incremented hash number associated with the at least one of the plurality of hash IDs.

18. The one or more non-transitory computer storage media of claim 15, wherein the computer-executable instructions further cause the processor to at least perform operations comprising, upon determining that the calculated hash ID does not match any of the plurality of hash IDs, storing the first block of data in the storage using the calculated hash ID as the index.

19. The one or more non-transitory computer storage media of claim 15, wherein the computer-executable instructions further cause the processor to at least perform operations comprising associating a domain ID with the calculated hash ID and the hash number as a unique 3-tuple corresponding to the first block of data.

20. The one or more non-transitory computer storage media of claim 15, wherein the storage has a plurality of domains associated therewith, each of the plurality of domains corresponding to a defined set of data in the storage, and wherein the computer-executable instructions further cause the processor to at least perform operations comprising:

associating the calculated hash ID and the hash number with a domain ID associated with a first domain, of the plurality of domains, to which the first block of data belongs;

moving the first block of data from the first domain to a second domain;

determining whether the calculated hash ID matches any of a plurality of hash IDs in the second domain; and upon determining that the calculated hash ID matches at least one of the plurality of hash IDs in the second domain:

comparing the first block of data with a third block of data, in the second domain, associated with the at least one of the plurality of hash IDs; and upon the first block of data being different from the third block of data based on the comparison, associate a second hash number and a domain ID with the calculated hash ID, storing the first block of data in the second domain using the calculated hash ID, associated hash number and associated domain ID as an index to the first block of data in the second domain, and linking the domain ID between the first and second domains.

* * * * *